(12) United States Patent
Salter et al.

(10) Patent No.: US 11,034,317 B2
(45) Date of Patent: Jun. 15, 2021

(54) PASSIVE ILLUMINATED GRILLE

(71) Applicant: Ford Global Technologies LLC, Dearborn, MI (US)

(72) Inventors: Stuart C. Salter, White Lake, MI (US); David Brian Glickman, Southfield, MI (US); Paul Kenneth Dellock, Northville, MI (US); Peter Joseph Bejin, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 96 days.

(21) Appl. No.: 16/218,844

(22) Filed: Dec. 13, 2018

(65) Prior Publication Data

US 2020/0189503 A1    Jun. 18, 2020

(51) Int. Cl.
*B60R 19/52*    (2006.01)
*F21S 41/24*    (2018.01)

(52) U.S. Cl.
CPC .............. *B60R 19/52* (2013.01); *F21S 41/24* (2018.01)

(58) Field of Classification Search
None
See application file for complete search history.

(56) References Cited

U.S. PATENT DOCUMENTS

| | | | |
|---|---|---|---|
| 4,816,968 | A | 3/1989 | Yamada et al. |
| 4,920,460 | A | 4/1990 | Mori |
| 9,714,749 | B1 | 7/2017 | Salter et al. |
| 2010/0232174 | A1 | 9/2010 | Arakawa et al. |
| 2018/0272927 | A1 | 9/2018 | Moore et al. |

FOREIGN PATENT DOCUMENTS

| | | |
|---|---|---|
| DE | 10340723 | 4/2005 |
| DE | 102005001114 | 7/2006 |
| DE | 102007005779 | 8/2008 |
| DE | 102015109390 | 10/2016 |
| DE | 102016114744 | 2/2017 |
| DE | 102015012724 | 4/2017 |
| JP | 2008105566 | 5/2008 |
| JP | 6194512 | 12/2015 |

*Primary Examiner* — Elmito Breval
(74) *Attorney, Agent, or Firm* — David Coppiellie; Carlson, Gaskey & Olds, P.C.

(57) ABSTRACT

A vehicle grille assembly is disclosed that is passively illuminated by accent lighting sources provided in a corresponding headlamp assembly. A primary light guide in communication with a light source and a secondary light guide is disposed within the vehicle grill. The secondary light guide receives light from the primary light guide to illuminate a portion of the vehicle grille.

19 Claims, 3 Drawing Sheets

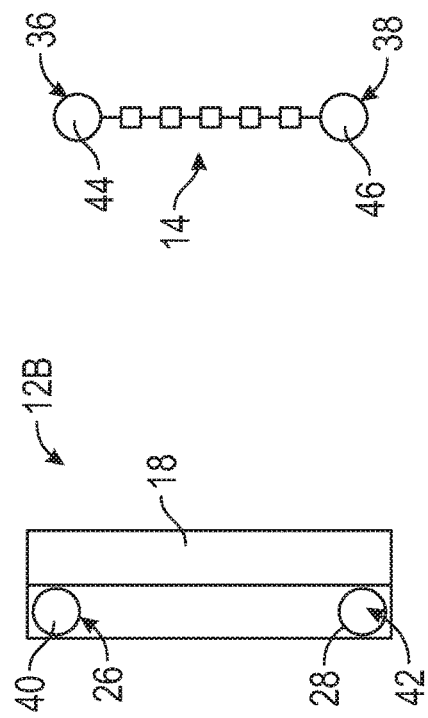
FIG. 3
FIG. 4
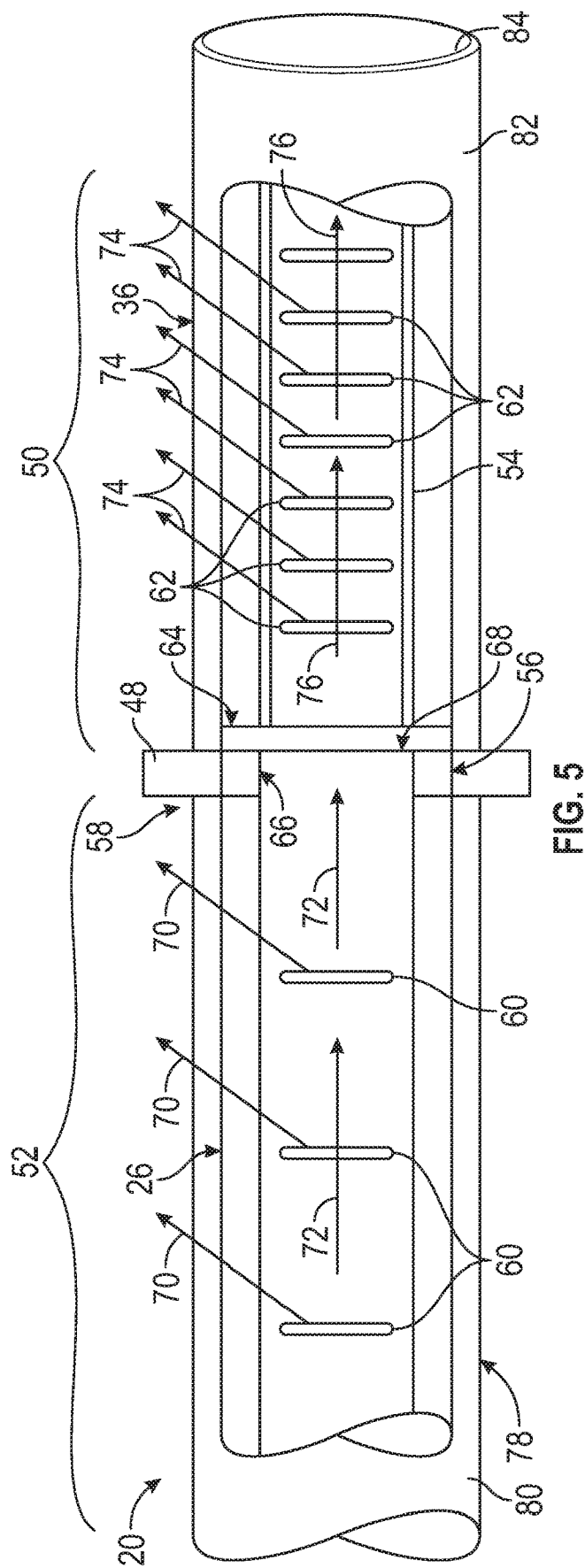
FIG. 5

PASSIVE ILLUMINATED GRILLE

TECHNICAL FIELD

This disclosure relates to passive accent illumination of a motor vehicle grille.

BACKGROUND

Vehicles include a front grille that defines an opening for airflow into an engine compartment. The grille is traditionally an ornamental feature of the vehicle. Accordingly, a vehicle grille includes design features that highlight the vehicle styling. Moreover, the front grille for a motor vehicle most often include a vehicle manufactures nameplate. The front of the vehicle also includes headlamps for illuminating the roadway at night. The headlamps may also contribute to the styling of the vehicle. The headlamps may include illuminated accent features that further contribute to vehicle styling. Vehicle manufactures are constantly seeking opportunities to increase customer interest and satisfaction while controlling costs and improving assembly.

SUMMARY

A vehicle grille assembly according to an exemplary aspect of the present disclosure includes, among other things, a primary light guide in communication with a light source and a secondary light guide disposed within the vehicle grill that receives light from the primary light guide.

In a further non-limiting embodiment of the foregoing vehicle grille assembly, the light source is part of a headlamp.

In a further non-limiting embodiment of any of the foregoing vehicle grille assemblies, the light source is an accent light mounted within the headlamp.

In a further non-limiting embodiment of any of the foregoing vehicle grille assemblies, a joint between the primary light guide and the secondary light guide includes black areas for blocking light leakage.

In a further non-limiting embodiment of any of the foregoing vehicle grille assemblies, the secondary light guide includes optic features that direct light into the vehicle grille.

In a further non-limiting embodiment of any of the foregoing vehicle grille assemblies, the primary light guide includes first optic features and the secondary light guide includes second optic features different than the first optic features.

In a further non-limiting embodiment of any of the foregoing vehicle grille assemblies, the primary light guide includes an upper portion and a lower portion and the secondary light guide includes an upper secondary light guide joined to the upper portion and a lower secondary light guide joined to the lower portion.

In a further non-limiting embodiment of any of the foregoing vehicle grille assemblies, the upper and lower secondary light guides extend parallel to each other into the vehicle grille.

In a further non-limiting embodiment of any of the foregoing vehicle grille assemblies, the light source is disposed at an intermediate location between the upper portion and the lower portion of the primary light guide.

A vehicle front assembly according to another exemplary aspect of the present disclosure includes, among other possible things, an accent light source emitting light into a primary light guide and a grille assembly including a secondary light guide coupled to the primary light guide and receiving light from the accent source through the primary light guide.

In a further non-limiting embodiment of the foregoing vehicle front assembly, the accent light source is part of headlamp assembly and the primary light guide is disposed about a periphery of the headlamp assembly.

In a further non-limiting embodiment of any of the foregoing vehicle front assemblies, the headlamp assembly includes a left headlamp assembly and a right headlamp assembly with the grille assembly disposed therebetween, and the secondary light guide receives light from a primary light guide disposed in each of the left headlamp assembly and the right headlamp assembly.

In a further non-limiting embodiment of any of the foregoing vehicle front assemblies, including a joint between the primary light guide and the secondary light guide is black to block light leakage.

In a further non-limiting embodiment of any of the foregoing vehicle front assemblies, the primary light guide includes first optic features and the secondary light guide includes second optic features that are different than the first optic features.

A method of assembling a vehicle front accent light assembly according to another exemplary aspect of the present disclosure includes, among other things, forming a headlamp with an accent light source and a primary light guide, forming a grille assembly with a secondary light guide and forming a joint between an open end of the primary light guide to an open end of the secondary light guide to enable transmission of light from the accent light source through the primary light guide into the secondary light guide.

In a further non-limiting embodiment of any of the foregoing method, forming the joint further comprises forming the joint at an interface between the headlamp assembly and the grille assembly to include a black coated portion for preventing light leakage.

In a further non-limiting embodiment the foregoing methods, forming the grille assembly further comprises thermoforming a partial metalized film on grille surfaces and forming the secondary light guide proximate the partial metalized film.

In a further non-limiting embodiment of any of the foregoing methods, forming the grille assembly further comprises forming optic features within the secondary light guide for directing light emitted from the secondary light guide.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 3 is a schematic side view of an example headlamp assembly.

FIG. 4 is a schematic side view of an example grille assembly.

FIG. 5 is a schematic view of an interface between a primary light guide and a secondary light guide.

DETAILED DESCRIPTION

Figure 1:
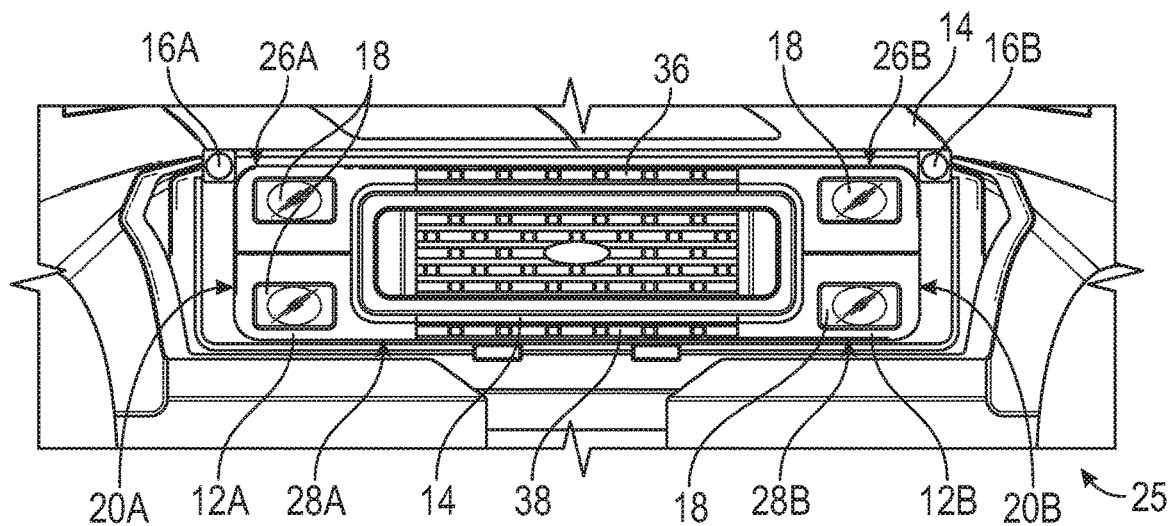
FIG. 1 is a front view of a vehicle headlamp and grille assembly.
Figure 2:
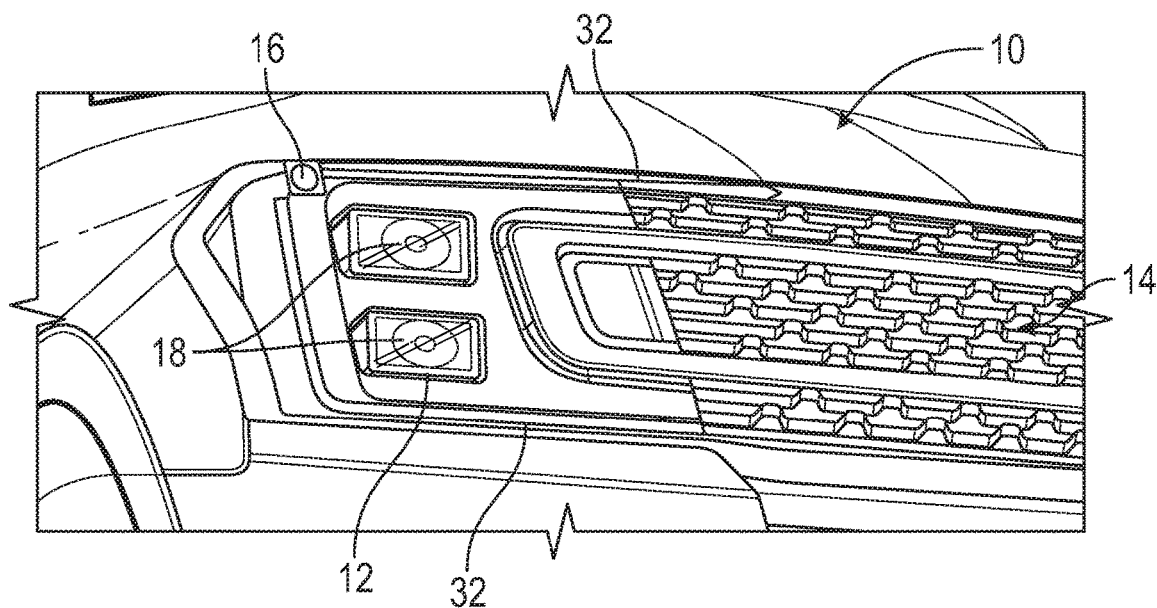
FIG. 2 is an enlarged view of a portion of the front assembly.

Referring to FIGS. 1 and 2, an example vehicle front assembly 25 includes a grille assembly 14 between left and right headlamp assemblies 12A, 12B. Each of the headlamp assemblies 12A, 12B includes headlamps 18 and accent lighting features 32. The accent lighting features 32 are illuminated by an accent light source 16A, 16B. The accent lighting features 32 are active during operation of the vehicle separate and independent of operation of the headlamps 18. The accent light sources 16A, 16B project light into primary light guides 20A, 20B. The light guides distribute the light around the periphery of each of the headlamp assemblies 12A, 12B to provide a desired accent light feature. It should be appreciated, that although the example accent light feature is disposed about a periphery of the headlamp assemblies 12A, 12B that other orientations and routings are within the contemplation and scope of this disclosure.

The example front assembly 25 includes illuminated portions of the grille assembly 14 with light transmitted from the accent light source 16. In one disclosed example, the grille assembly 14 includes an upper secondary light guide 36 and a lower secondary light guide 38. The upper and lower secondary light guides 36, 38 are in communication with the primary light guides 20A, 20B provided in each of the headlamp assemblies 12A, 12B.

The example primary light guides 20A, 20B each includes an upper primary light guide 26A, 26B and a lower primary light guide 28A, 28B. The accent light source 16A, 16B is disposed between the upper and lower primary light guides 26A, 26B, 28A and 28B. Each of the upper and lower primary light guides 26A, 26B, 28A, 28B are joined to a corresponding one of the secondary light guides 36, 38 disposed within the grille assembly 14. The secondary light guides 36, 38 emit light that illuminates the grille assembly whenever the accent lighting features 32 are active. Light is communicated into the secondary light guides 36, 38 from both headlamp assemblies 12A, 12B and thereby both directions toward a center part of the grille assembly 14. According, the example grille assembly 14 is illuminated utilizing light from light source within the headlamp assemblies 12A, 12B and does not utilized an additional light generating source.

Referring to FIGS. 3 and 4 with continued reference to FIGS. 1 and 2, the example headlamp assembly 12B is shown in cross-section and illustrates openings 40 and 42 for the corresponding upper and lower primary light guides 26B, 28B. The openings 40 and 42 are open to enable communication of light to corresponding openings 44 and 46 in the secondary light guides 36, 38 within the grille assembly 14.

Referring to FIG. 5, with continued reference to FIG. 1-4, a joint 58 between an upper portion 26 of the primary light guide 20 and the upper secondary light guide 36 is schematically illustrated and is formed at an end wall 48 of the headlamp assembly 12. The end wall 48 in this example includes an opening 66 into which an end 68 of the upper portion 26 of the light guide 20 is inserted. The end 68 is attached to the end wall 48 by a weld or other attachment process. An area 56 where light crosses from the headlamp assembly 12 into the grille assembly 14 is painted or molded in black to prevent light from leaking into other surfaces of the grille assembly 14 or headlamp assembly 12. A grommet 64 may also be included at the joint 58 to provide additional blocking of light leakage into other portions of the grille assembly 14 and headlamp assembly 12.

The primary light guide 26 includes a plurality of first optic features 60 to direct some light outward from the light guide as schematically shown by arrow 70. A majority of light is transmitted through the primary light guide 26 as is shown by arrow 72 to the secondary light guide 36.

The secondary light guide 36 includes a second plurality of optic features 62 that direct light outward as is schematically shown by arrows 74. A lesser portion of light, schematically shown by arrows 76 is transmitted further along the light guide 36. The first plurality of optic features 60 within the primary light guide 26 is different than the second plurality of optic features 62 within the secondary light guide 36. In this example, the difference between the first plurality of optic features 60 and the second plurality of optic features 62 is a density of the light guides along the length of the corresponding light guide. In this example, the primary light guide 26 includes a smaller density of optic features 60. The second group of optic features 62 is more densely populated to direct more light outward. Additional optic features 62 are provided within the secondary light guide 44 because it is further from the light source 16 and thereby benefits from the additional optic features to maintain a desired intensity and uniformity of illumination.

The disclosed primary light guide 26 is disposed within a channel 78 formed in the headlamp assembly 12. The example channel 78 includes a white reflector coating schematically indicated at 80 that aids in directing light outward. A vacuum metalized layer may also be present that provides a desired chrome accent and appearance.

The secondary light guide 36 is disposed within a channel, schematically shown at 82, and behind a metallized film, schematically shown at 84. The metallized film 84 enables the grille assembly 14 to maintain a chrome appearance during daylight operation. The secondary light guide 36 may further include a long persistence white coating 54 to further generate the desired light accent appearance.

Moreover, both the primary and secondary light guides 26, 36 may include the long persistence white phosphor coating to enable the accent lighting to glow even when the accent lighting source 16 is not activated. The long persistence white phosphor coating may charge in the presence of sunlight, prior actuation of the light source and/or by lights from other sources such as passing vehicles.

Figure 6:
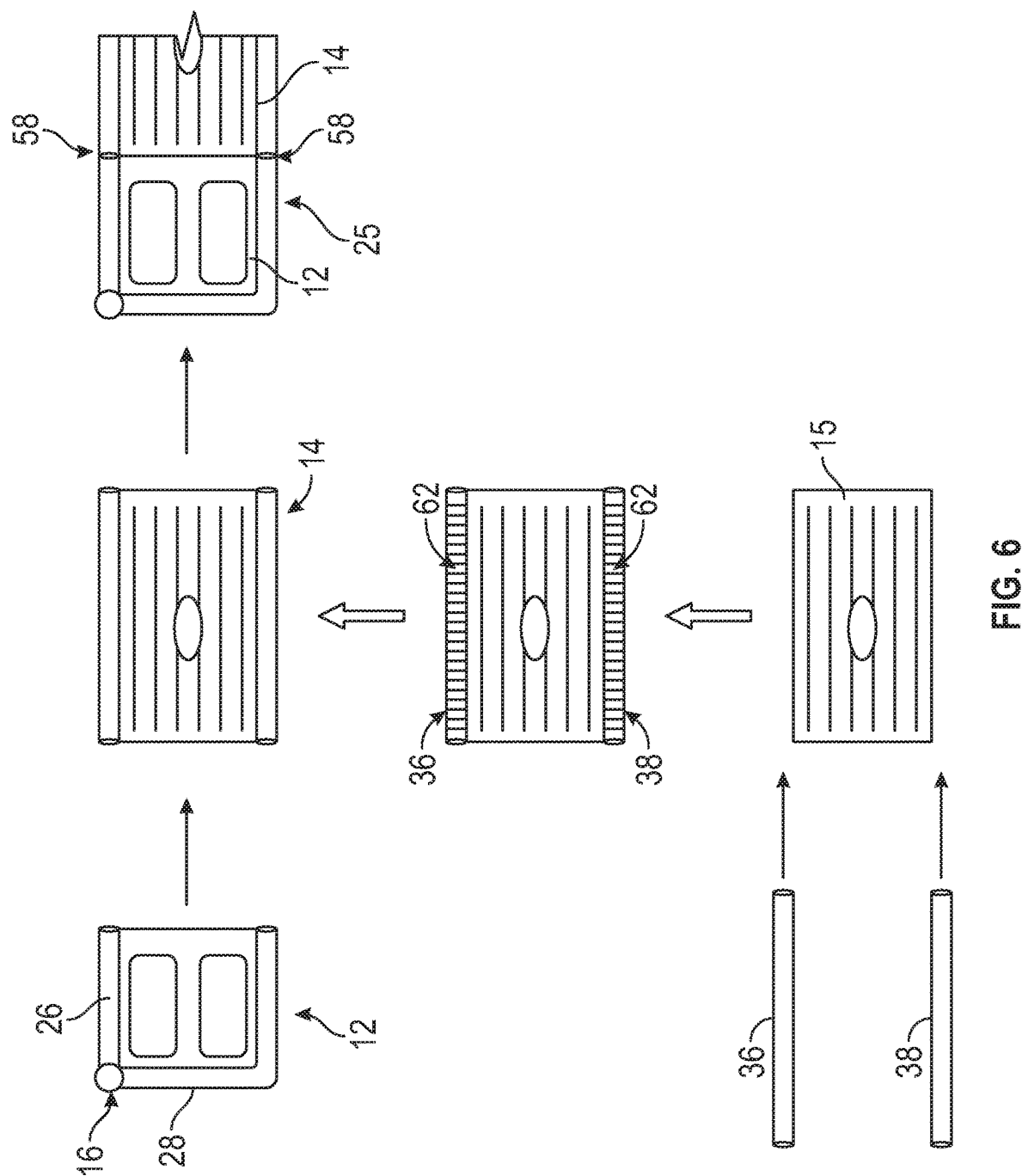
FIG. 6 is a schematic view of a method of assembling a vehicle front assembly.

Referring to FIG. 6, with continued reference to FIGS. 1-5, an example method of assembling a vehicle front assembly 25 is schematically illustrated. The example method includes a first step of forming a headlamp assembly 12 to include an accent light source 16 along with the headlamps 18. The accent light source is formed to emit light into the upper and lower primary light guides 26, 28.

A further step is forming the grille assembly 14 to include the upper secondary light guide 36 and the lower secondary light guide 38. These may be assembled separately to a grille 15 or may be formed integrally with the grille 15. In one example embodiment, the light guides 36, 38 are assembled to the grille 15. Once assembled to the grille 15, the secondary light guides 36 and 38 are molded to include optic features 62 to enable and provide a uniform illumination of the grille 15 along the entire length between the headlamp assemblies. Once the secondary light guides 36 and 38 are assembled to the grille 14, it is then coupled to the headlamp 12.

Coupling of the headlamp 12 to the grille 14 requires a formation of a joint 58 between the primary light guides 26, 28 and the second light guides 44, 46. Moreover, the formation of the joint is accomplished along with the use of the formation of the area 56 including black portions within the interface to prevent light leakage at the coupling joint 58 between the primary 26,28 and secondary 36,38 light guides.

Accordingly, the example front assembly includes features that utilize accent lighting generated within the headlamp assembly to illuminate portions of the front grille. Accordingly, additional lighting structures are not required as existing accent lighting is utilized to provide the desired illumination.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle grille assembly comprising:
   a primary light guide in communication to receive light from a light source, wherein the light source is part of a headlamp; and
   a secondary light guide disposed within a vehicle grille, the secondary light guide receiving light from the primary light guide.

2. The vehicle grille assembly as recited in claim 1, wherein the light source is an accent light mounted within the headlamp.

3. The vehicle grille assembly as recited in claim 1, including a joint between the primary light guide and the secondary light guide, wherein the joint includes a black areas for blocking light leakage.

4. The vehicle grille assembly as recited in claim 1, wherein the secondary light guide includes optic features that direct light into the vehicle grille.

5. The vehicle grille assembly as recited in claim 1, wherein the primary light guide includes first optic features and the secondary light guide includes second optic features different than the first optic features.

6. The vehicle grille assembly as recited in claim 5, wherein the first optic features and the second optic features direct light outward from the primary light guide.

7. The vehicle grille assembly as recited in claim 5, wherein a density of the first optic features is less than a density of the second optic features.

8. The vehicle grille assembly as recited in claim 7, wherein the second optic features are spaced further away from the light source than the first optic features.

9. The vehicle grille assembly as recited in claim 1, wherein the primary light guide includes an upper portion and a lower portion and the secondary light guide includes an upper secondary light guide joined to the upper portion and a lower secondary light guide joined to the lower portion.

10. The vehicle grille assembly as recited in claim 9, wherein the upper and lower secondary light guides extend parallel to each other into the vehicle grille.

11. The vehicle grille assembly as recited in claim 9, wherein the light source is disposed at an intermediate location between the upper portion and the lower portion of the primary light guide.

12. The vehicle grille assembly as recited in claim 1, wherein the secondary light guide is disposed within a channel and behind a metallized film to provide a chrome appearance during daylight operation.

13. The vehicle grille assembly as recited in claim 1, wherein both the primary and secondary light guides include a long persistence white phosphor coating to provide a glow after the light source is deactivated.

14. The vehicle grille assembly as recited in claim 1, wherein the primary light guide includes a horizontal upper light guide and a horizontal lower light guide and a vertical light guide portion.

15. A vehicle front assembly comprising:
    an accent light source emitting light into a primary light guide; and
    a grille assembly including a secondary light guide coupled to the primary light guide and receiving light from the accent light source through the primary light guide.

16. The vehicle front assembly as recited in claim 15, wherein the accent light source is part of headlamp assembly and the primary light guide is disposed about a periphery of the headlamp assembly.

17. The vehicle front assembly as recited in claim 16, wherein the headlamp assembly includes a left headlamp assembly and a right headlamp assembly with the grille assembly disposed therebetween and the secondary light guide receives light from a primary light guide disposed in each of the left headlamp assembly and the right headlamp assembly.

18. The vehicle front assembly as recited in claim 17, wherein a joint between the primary light guide and the secondary light guide is black to block light leakage.

19. The vehicle front assembly as recited in claim 15, wherein the primary light guide includes first optic features and the secondary light guide includes second optic features that are different than the first optic features.

* * * * *